US012794302B2

(12) United States Patent

Kim et al.

(10) Patent No.: US 12,794,302 B2

(45) Date of Patent: Nov. 10, 2026

(54) TERMINAL ASSEMBLY

(71) Applicant: HYUNDAI MOBIS CO., LTD., Seoul (KR)

(72) Inventors: Dae Wook Kim, Yongin-si (KR); Seong Jun Hwang, Seogwipo-si (KR); Hyun Ho Park, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 206 days.

(21) Appl. No.: 18/676,769

(22) Filed: May 29, 2024

(65) Prior Publication Data

US 2025/0105694 A1 Mar. 27, 2025

(30) Foreign Application Priority Data

Sep. 26, 2023 (KR) ........................ 10-2023-0129344

(51) Int. Cl.
*H02K 3/50* (2006.01)

(52) U.S. Cl.
CPC ........... *H02K 3/50* (2013.01); *H02K 2203/09* (2013.01)

(58) Field of Classification Search
CPC ...... H02K 3/50; H02K 2203/09; H02K 3/505; H02K 3/28; H02K 3/521; H02K 2203/06
See application file for complete search history.

(56) References Cited

U.S. PATENT DOCUMENTS

| | | | | |
|---|---|---|---|---|
| 2012/0187783 A1* | 7/2012 | Edrington | H02K 3/28 310/71 |
| 2012/0286593 A1* | 11/2012 | Yokogawa | H02K 3/522 310/43 |
| 2019/0089108 A1* | 3/2019 | Lee | H02K 3/522 |
| 2020/0273599 A1* | 8/2020 | Imamura | H01B 5/02 |

FOREIGN PATENT DOCUMENTS

KR 10-2023-0096753 A 6/2023

* cited by examiner

*Primary Examiner* — Tulsidas C Patel
*Assistant Examiner* — Mohammed Ahmed Qureshi
(74) *Attorney, Agent, or Firm* — Morgan, Lewis & Bockius LLP

(57) ABSTRACT

The present disclosure relates to a terminal assembly, and more particularly, to a terminal assembly having improved coupling with an end coil. The terminal assembly of the present disclosure has the effect of enhancing space utilization by applying the terminal assembly to the side surface portion of the coil, has the effect of automating the process and reducing costs by allowing the same type of windings to be used regardless of the positions of the windings, and has the effect of improving coupling robustness between the winding and the terminal assembly by including epoxy for coating the terminal assembly and the end coil.

12 Claims, 9 Drawing Sheets

TERMINAL ASSEMBLY

CROSS-REFERENCE TO RELATED APPLICATIONS

This application claims priority under 35 U.S.C. § 119 to Korean Patent Application No. 10-2023-0129344, filed on Sep. 26, 2023, in the Korean Intellectual Property Office, the disclosure of which is incorporated herein by reference in its entirety.

TECHNICAL FIELD

The following disclosure relates to a terminal assembly, and more particularly, to a terminal assembly having improved coupling with an end coil.

BACKGROUND

A conventional stator includes a coil that is wound, and a terminal busbar, which is provided separately from the coil in a crown portion located at an end of the coil, is installed to be spaced apart from a stator in an axial direction to transmit power to the coil. At this time, when the coil is inserted into a hairpin structure, various types of windings have to be used.

More specifically, a hairpin winding method is a method of inserting hairpin coils formed to have a U-shape (a hairpin shape) into slots of a stator core in an axial direction sequentially and then welding the ends of each coil. In this method, without the need to manufacture a winding bundle in advance, a process is completed by inserting the hairpin coils between stator shoes, advantageously simplifying the process, but since this process has a disadvantage in that a protective coating should be stacked after welding the ends of multiple hairpin coils, the method is ineffective in terms of manufacturing cost and required time.

In addition, as there are multiple welding sites, welding defects inevitably occurred. In addition, in the case of the hairpin winding method, since the ends of the hairpin coils requiring welding extends to protrude to the outside of the stator, an axial length of the stator lengthens. In addition, as a structure of the terminal assembly is mounted on top of a crown portion end coil, the overall height of a stator assay increases, and as the shapes of windings vary, the logic of a winding manufacturing device for each winding should be changed one by one to correspond to the terminal assembly and a winding in the form corresponding to a position should be inserted, which is disadvantageous in mass-production.

SUMMARY

An embodiment of the present disclosure is directed to providing a terminal assembly which may be applied to a side surface portion of a coil to enhance space utilization.

Another embodiment of the present disclosure is directed to providing a terminal assembly in which the same type of windings is used regardless of positions of the windings, thereby automating the process and reducing costs.

Another embodiment of the present disclosure is directed to providing a terminal assembly capable of improving the coupling robustness between the winding and the terminal assembly by including epoxy for coating the terminal assembly and an end coil.

In one general aspect, a terminal assembly applied to a motor stator including a coil assembly having a plurality of windings therein includes: a first connecting member including a first coupling portion having one end electrically coupled to an end of a winding and a first busbar formed integrally with the first coupling portion and disposed on a radial outer side of the coil assembly; at least one second connecting member including a second coupling portion having one end electrically coupled to at least one winding adjacent to the winding coupled to the first busbar and a second busbar integrally formed with the second coupling portion and disposed on an outer side of the coil assembly in a radial direction; and two or more jump wires each including a third coupling portion having one end electrically coupled to the end of the winding and a serial connecting portion formed integrally with the third coupling portion and disposed on an inner side of the coil assembly in a radial direction, wherein the first coupling portion and the second coupling portion extend toward the motor stator from the end of the winding so as to be substantially parallel to a rotation axis of the motor stator, and the first busbar and the second busbar are arranged to be spaced apart from each other by a predetermined distance in a radial direction of the motor stator.

The first busbar and the second busbar may extend in an arc shape in a circumferential direction of the motor stator, and one surface of each of the first busbar and the second busbar may be substantially parallel to an extension direction of the first coupling portion and the second coupling portion.

The first connecting member may include a first bent portion having respective ends connected to and integrally formed with the first coupling portion and the first busbar and extending outwardly in the radial direction of the motor stator, the second connecting member may include a second bent portion having respective ends connected to and integrally formed with the second coupling portion and the second busbar and extending outwardly in the radial direction of the motor stator, and the second bent portion may extend to be longer than the first bent portion in the radial direction of the motor stator.

One surface of the second busbar may be disposed in a position overlapping one surface of the first busbar by a predetermined area.

The second connecting member may be provided in two or more connecting members, at least one of the second busbars may be disposed to cover an upper end portion of the first busbar, and at least another one of the second busbars may be disposed to cover a lower end portion of the first busbar.

The first busbar and the second busbar may extend in an arc shape in a circumferential direction of the motor stator, and one surface of each of the first busbar and the second busbar may be substantially perpendicular to an extension direction of the first coupling portion and the second coupling portion.

The first busbar and the second busbar may include a protrusion disposed at an outermost portion and protruding toward the opposite side of the motor stator with respect to the radial direction of the motor stator.

The serial connecting portion may be bent stepwise in the radial direction of the motor stator.

The jump wires may be arranged to be spaced apart from each other by a predetermined distance in the radial direction of the motor stator, the serial connecting portions of all of the jump wires may be located at the same height based on an axial direction of the motor stator, and a predetermined area of one surface of each of the serial connecting portions may be in contact with an adjacent one of the serial connecting portions.

The terminal assembly may further include: a coating portion covering and coating the ends of the first connecting member, the at least one second connecting member, the jump wires, and the coil assembly.

Other features and aspects will be apparent from the following detailed description, the drawings, and the claims.

DETAILED DESCRIPTION OF EMBODIMENTS

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure based on the principle that the inventor is allowed to define terms.

Hereinafter, a basic configuration of a terminal assembly 1000 of the present disclosure will be described with reference to FIGS. 1 and 2.

Figure 1:
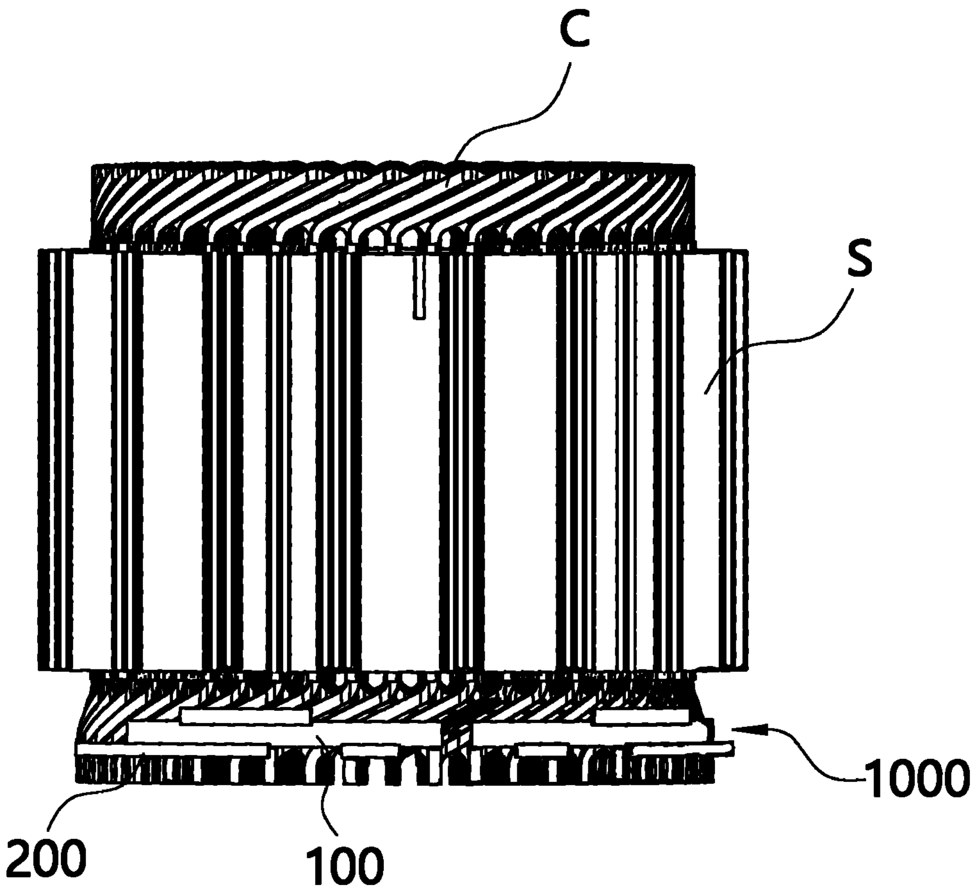
FIG. 1 is a side view illustrating a motor stator to which a terminal assembly of the present disclosure is applied.
Figure 2:
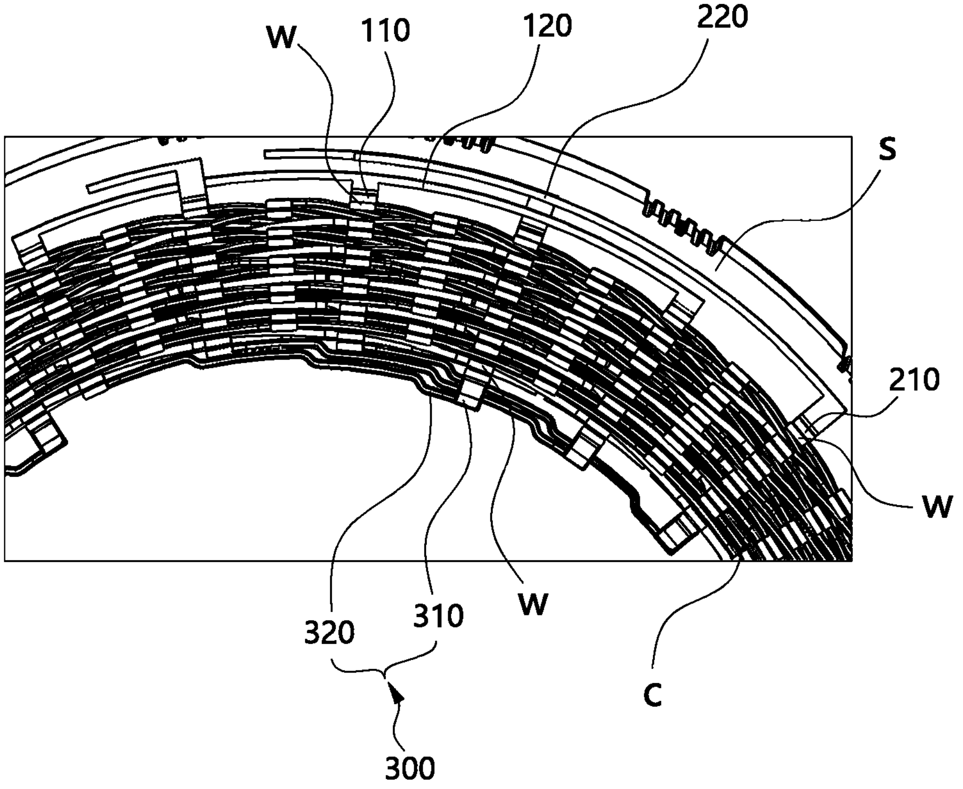
FIG. 2 is a partial top view illustrating first and second connecting members of the present disclosure.

As shown in FIG. 1, the present disclosure may be applied to a motor stator S that includes a coil assembly C including a plurality of windings W therein. As shown in FIG. 2, the terminal assembly 1000 of the present disclosure may include a first connecting member 100, a second connecting member 200, and a jump wire 300 that are electrically and physically connected to the winding W. In more detail, the first connecting member 100 may include a first coupling portion 110 at one end electrically coupled to an end of the winding W and may include a first busbar 120 integrally formed with the first coupling portion 110 and provided outside the coil assembly C in a radial direction. In addition, the second connecting member 200 may include a second coupling portion 210 at one end electrically respectively coupled to at least one winding W adjacent to the winding W coupled to the first connecting member 100 and may include a second busbar 220 integrally formed with the second coupling portion 210 and provided outside the coil assembly C in the radial direction. Two or more second connecting members 200 may be provided.

At this time, the first coupling portion 110 and the second coupling portion 210 may extend from the end of the winding W toward a motor stator S so as to be parallel to a rotation axis of the motor stator S. Accordingly, an axial length of the entire motor including the stator S, the coil assembly C, and the terminal assembly 1000 may be reduced and space utilization may be improved. In addition, the first busbar 120 and the second busbar 220 may be formed to extend in an arc shape in a circumferential direction of the motor stator S and may be spaced apart from each other by a predetermined interval in the radial direction of the motor stator S. That is, a first outer extension and a second outer extension may not contact each other but may be arranged to form individual layers in the radial direction of the motor stator S. Accordingly, the first busbar 120 and the second busbar 220 may be insulated from each other.

In addition, the terminal assembly 1000 of the present disclosure may include a plurality of jump wires 300, and the jump wire 300 may include a third coupling portion 310 at one end electrically coupled to the end of the wiring W and a serial connecting portion 320 integrally formed with the third coupling portion 310 and provided inside the coil assembly C in the radial direction. That is, the jump wire 300 may be provided on the opposite side of the first busbar 120 and the second busbar 220 with respect to the coil assembly C. Each jump wire 300 is connected in series to electrically connect a plurality of windings W to each other. The plurality of jump wires 300 may all be formed in a single shape, and the jump wires 300 may have a shape extending along the side of the coil assembly C.

In this manner, even if the shapes of all windings W are unified, the coil assembly C may be easily connected to the outside by simply changing the arrangement of the first connecting member 100, the second connecting member 200, and the jump wire 300 coupled to each winding W. In addition, since the jump wires 300 coupled to each winding W are all formed in the same shape, automation of the process may be achieved.

Hereinafter, a first embodiment of the terminal assembly 1000 of the present disclosure will be described in more detail with reference to FIG. 3.

Figure 3:
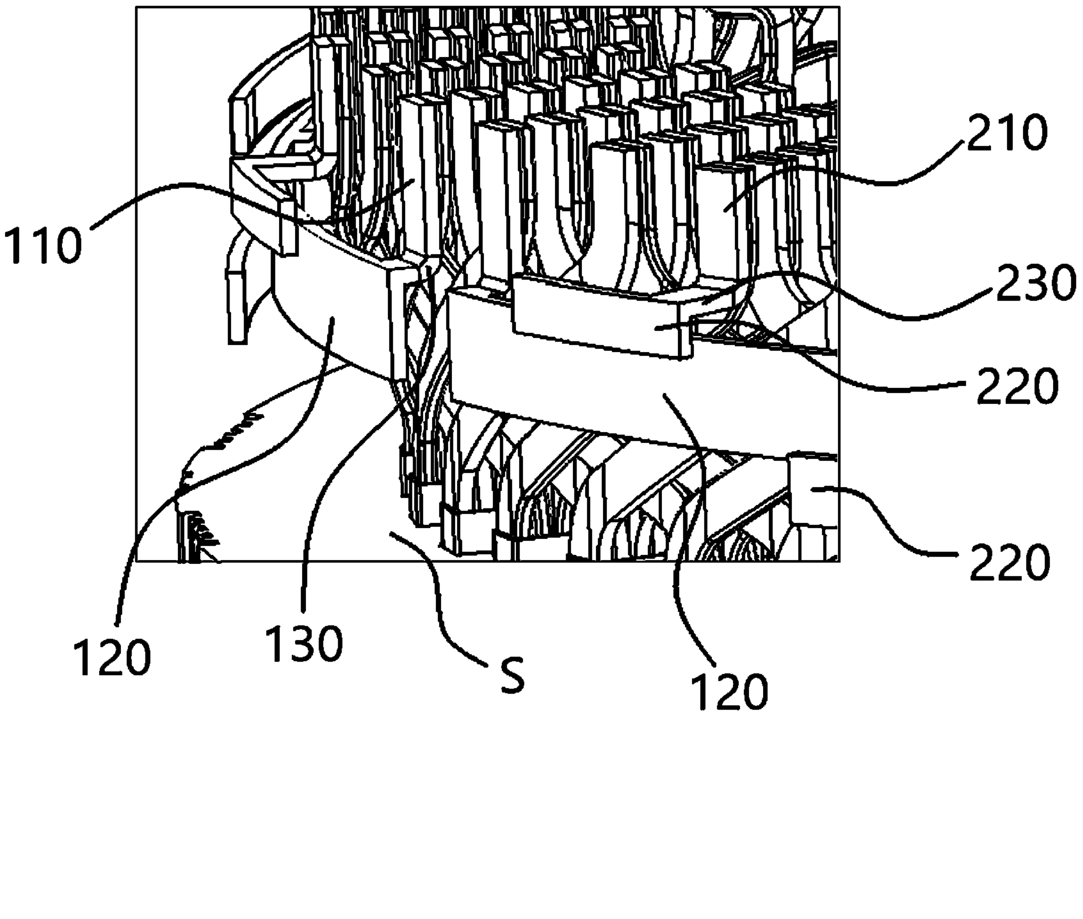
FIG. 3 is a partial perspective view illustrating a terminal assembly of the present disclosure.

As shown in FIG. 3, one surface of each of the first busbar 120 and the second busbar 220 may be parallel to an extension direction of the first coupling portion 110 and the second coupling portion 210. At this time, one surface of each of the first busbar 120 and the second busbar 220 may be a surface perpendicular to the radial direction of the motor stator S, and one surface of each of the first busbar 120 and the second busbar 220 may be formed flat. The first busbar 120 and the second busbar 220 may be formed so that one surface thereof has the largest area among the other surfaces.

In this manner, one of the surfaces of the first busbar 120 and the second busbar 220 having the largest area is formed parallel to the rotation axis of the motor stator S, thereby reducing a radial thickness of the terminal assembly 1000. A space may be formed between a side surface of the motor stator S and the outermost portion of the terminal assembly 1000, and a terminal formed of a PPS material may be easily coupled.

In addition, the first connecting member 100 may include a first bent portion 130 having both ends connected to and integrally formed with the first coupling portion 110 and the first busbar 120 and extending outwardly in the radial direction of the motor stator S, and the second connecting member 200 may include a second bent portion 230 having both ends connected to and integrally formed with the second coupling portion 210 and the second busbar 220 and extending outwardly in the radial direction of the motor stator S. The second bent portion 230 may extend to be longer than the first bent portion 130 in the radial direction of the motor stator S. At this time, the second bent portion 230 may extend to have a length such that the first busbar 120 and the second busbar 220 are not in contact with each other, considering the thickness of the first busbar 120 and the second busbar 220. Accordingly, a first outer extension and a second outer extension may not be in contact with each other and may be arranged to form individual layers in the radial direction of the motor stator S, and the first busbar 120 and the second busbar 220 may be insulated from each other.

At this time, one surface of the second busbar 220 may be provided in a position overlapping one surface of the first busbar 120 by a predetermined area. Accordingly, space utilization may be improved. Furthermore, two or more second connecting members 200 may be provided, and at least one of the second busbars 220 may be provided to cover an upper end portion of the first busbar 120, and at least another of the second busbars 220 may be provided to cover a lower end portion of the first busbar 120. At this time, each of the second busbars 220 covering the upper and lower end portions of the first busbar 120 may be spaced apart from each other by a predetermined distance in the axial direction of the motor stator S. That is, there may be a region of the first busbar 120 that does not overlap the second busbar 220, and thus the first busbar 120 may be partially exposed to the outside. Accordingly, the region may be utilized as a pin space to support positions of the first busbar 120 and the second busbar 220 in the process of adding external components later.

Hereinafter, a second embodiment of the terminal assembly 1000 of the present disclosure will be described in more detail with reference to FIGS. 4 and 5.

Figure 4:
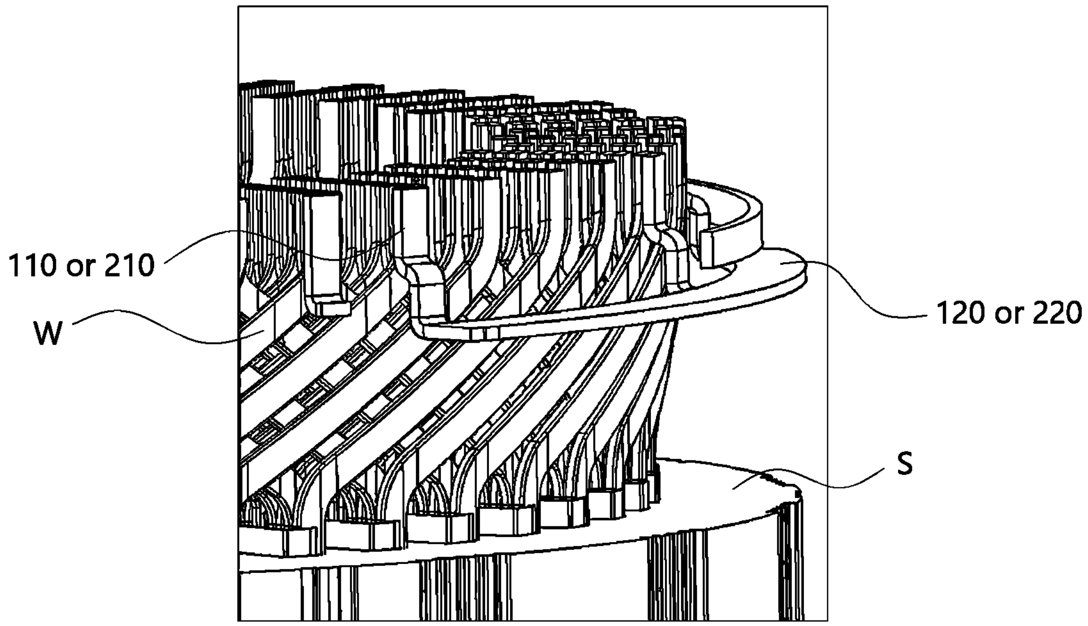
FIG. 4 is a partial perspective view illustrating a terminal assembly of the present disclosure.

As shown in FIG. 4, in the second embodiment of the terminal assembly 1000 of the present disclosure, the first busbar 120 and the second busbar 220 may extend in an arc shape in the radial direction of the motor stator S, and one surface of each of the first busbar 120 and the second busbar 220 may be formed to be perpendicular to the extension direction of the first coupling portion 110 and the second coupling portion 210. At this time, one surface of each of the first busbar 120 and the second busbar 220 may be a surface perpendicular to the radial direction of the motor stator S, and one surface of each of the first busbar 120 and the second busbar 220 may be formed flat. The first busbar 120 and the second busbar 220 may be formed so that the area of one surface is the largest among the other surfaces.

In this manner, since one of the surfaces of the first busbar 120 and the second busbar 220 having the largest area is formed to be perpendicular to the rotation axis of the motor stator S, a cooling oil O that cools the coil assembly C may remain on one surface of each of the first busbar 120 and the second busbar 220 and the cooling efficiency of the coil assembly C may be increased.

Figure 5:
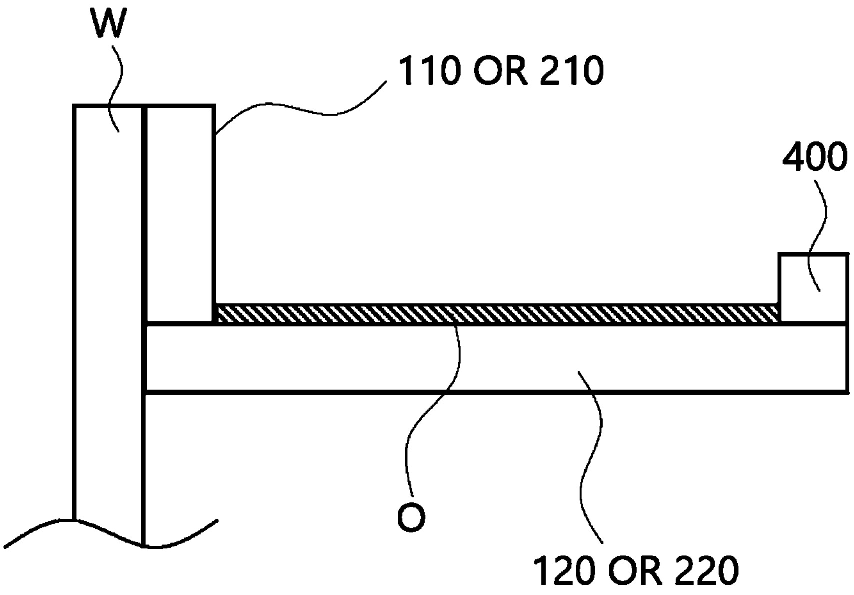
FIG. 5 is a schematic diagram illustrating a detailed embodiment of the terminal assembly of the present disclosure.

In addition, as shown in FIG. 5, the first busbar 120 and the second busbar 220 may include a protrusion 400 formed at the outermost portion and protruding to the opposite side of the motor stator S with respect to the radial direction of the motor stator S. Alternatively, one surface of each of the first busbar 120 and the second busbar 220 may be formed as a curved surface having a predetermined curvature to perform the same role as that of the protrusion 400 described above. Accordingly, the cooling oil O that cools the coil assembly C may stay on one surface of each of the first busbar 120 and the second busbar 220 for a longer time and the cooling efficiency of the coil assembly C may be increased.

Hereinafter, the jump wire 300 of the present disclosure will be described in more detail with reference to FIGS. 6 to 8.

Figure 6:
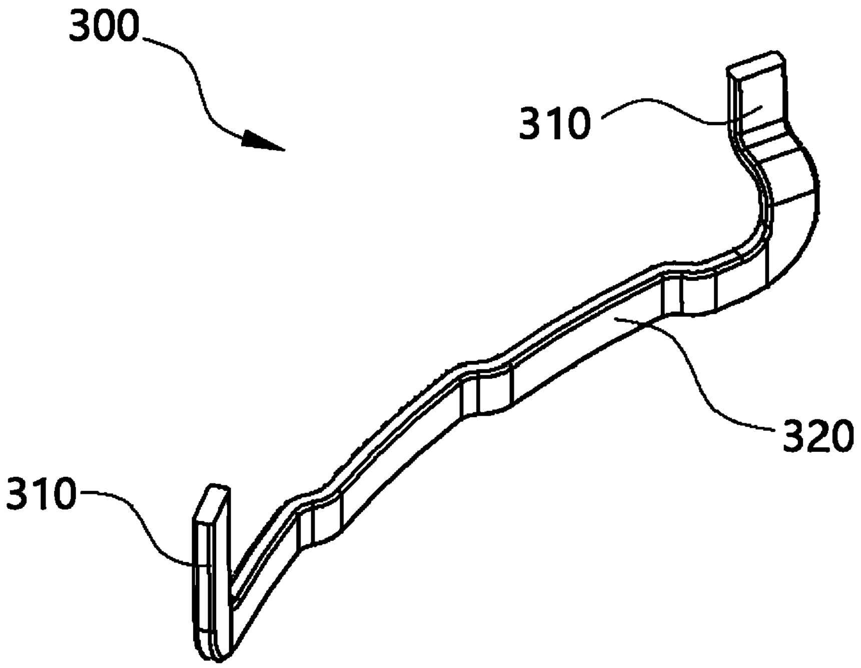
FIG. 6 is a perspective view illustrating an embodiment of a jump wire of the present disclosure.
Figure 7:
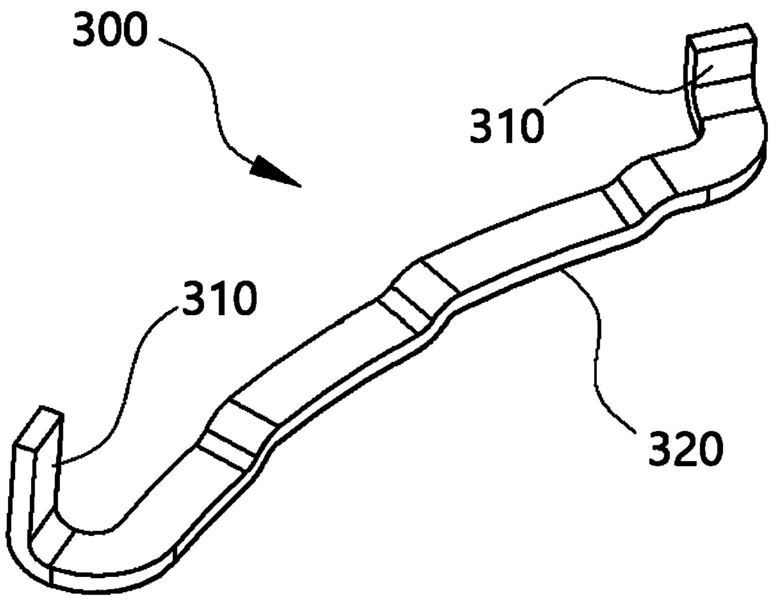
FIG. 7 is a perspective view illustrating another embodiment of the jump wire of the present disclosure.

As shown in FIGS. 6 and 7, the terminal assembly 1000 of the present disclosure may include the jump wire 300 provided on the radial inner side of the coil assembly C, and a serial connecting portion 320 of the jump wire 300 is preferably formed to be bent stepwise in the radial direction of the motor stator S. FIG. 6 shows a case in which a contact surface of each jump wire 300 (the largest surface of an outer surface of the jump wire 300) is provided in a direction parallel to the axial direction of the motor stator S, and FIG. 7 shows a case in which the contact surface of each jump wire 300 (the largest surface of an outer surface of the jump wire 300) is provided in a direction perpendicular to the axial direction of the motor stator S.

At this time, the bent portion may be equal to a gap between the windings W, and a radial height difference at the bent portion may be proportional to a thickness of the jump wire 300. Accordingly, a plurality of jump wires 300 formed in the same shape may be sequentially stacked according to a coupling position and may be connected to each other in series.

Figure 8:
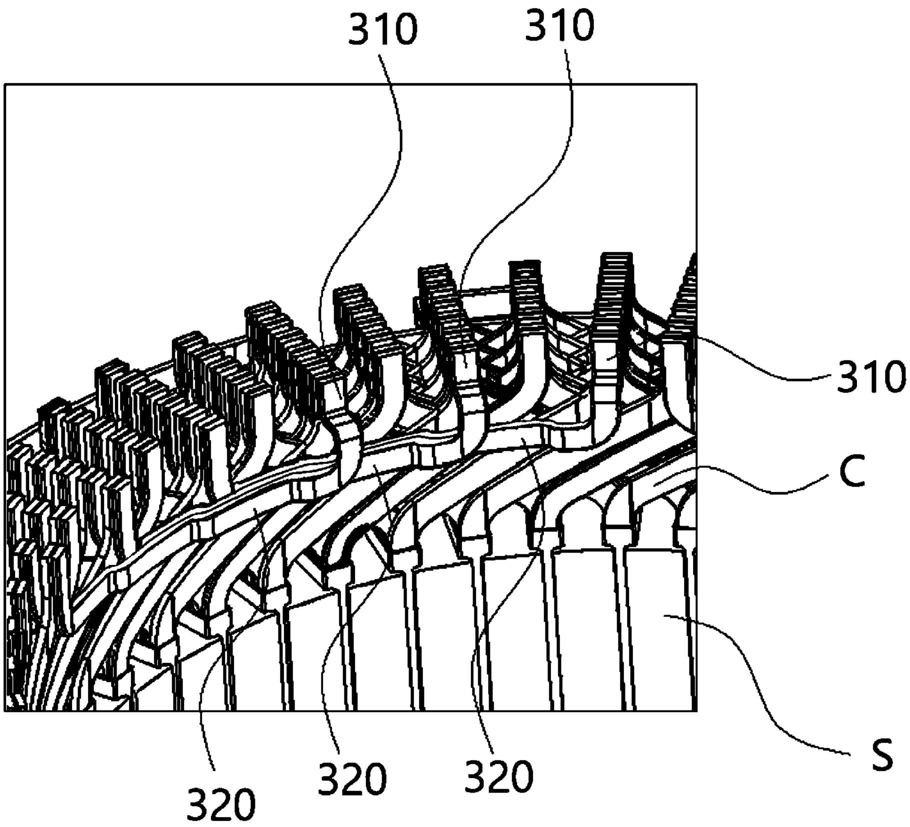
FIG. 8 is a partial perspective view illustrating an arrangement of a jump wire of the present disclosure.

That is, as shown in FIG. 8, the jump wires 300 may be arranged to be spaced apart from each other by a predetermined distance in the radial direction of the motor stator S (the position is dependent on the winding W to be coupled), respectively, and all jump wires 300 may be located at the same height based on the axial direction of the motor stator S and a predetermined area of one surface thereof may be in contact with each other. Accordingly, the jump wire 300 may connect each winding W in series.

Hereinafter, the coating portion 500 of the present disclosure will be described in more detail with reference to FIG. 9.

Figure 9:
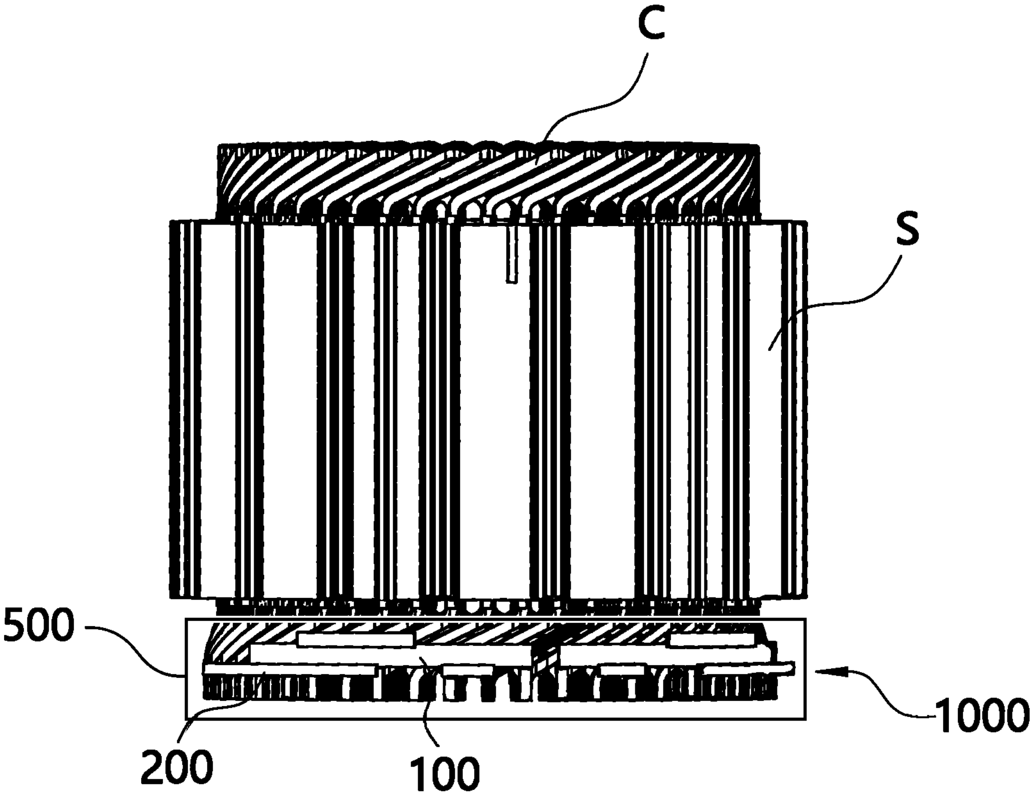
FIG. 9 is a side view illustrating a coating portion of the present disclosure.

As shown in FIG. 9, the terminal assembly may further include the coating portion 500 that covers and coats the ends of the first connecting member 100, the second connecting member 200, the jump wire 300, and the coil assembly C. The coating portion 500 may include an epoxy material or may be a spray-type coating. Since the terminal assembly 1000 of the present disclosure includes the coating portion 500, the first connecting member 100, the second connecting member 200, and the jump wire 300 may be insulated from the outside and coupling rigidity between the terminal assembly 1000 and the coil assembly C may be increased.

The terminal assembly of the present disclosure configured as described above has the effect of enhancing space utilization by applying the terminal assembly to the side surface portion of the coil.

In addition, there is an effect of automating the process and reducing costs by allowing the same type of windings to be used regardless of the positions of the windings.

In addition, since epoxy for coating the terminal assembly and the end coil is included, there is an effect of improving coupling robustness between the winding and the terminal assembly.

The present disclosure should not be construed as being limited to the above-mentioned exemplary embodiment. The present disclosure may be applied to various fields and may be variously modified by those skilled in the art without departing from the scope of the present disclosure claimed in the claims. Therefore, it is obvious to those skilled in the art that these alterations and modifications fall within the scope of the present disclosure.

DETAILED DESCRIPTION OF MAIN ELEMENTS

1000: terminal assembly
100: first connecting member
110: first coupling portion
120: first busbar
130: first bent portion
200: second connecting member
210: second coupling portion
220: second busbar
230: second bent portion
300: jump wire
310: third coupling portion
320: serial connecting portion
400: protrusion
500: coating portion
S: motor stator
C: coil assembly
W: winding
O: cooling oil

What is claimed is:

1. A terminal assembly applied to a motor stator including a coil assembly having a plurality of windings therein, the terminal assembly comprising:

a first connecting member including a first coupling portion having one end electrically coupled to an end of a winding and a first busbar formed integrally with the first coupling portion and disposed on a radial outer side of the coil assembly;

at least one second connecting member including a second coupling portion having one end electrically coupled to at least one winding adjacent to the winding coupled to the first busbar and a second busbar integrally formed with the second coupling portion and disposed on an outer side of the coil assembly in a radial direction; and two or more jump wires each including a third coupling portion having one end electrically coupled to the end of the winding and a serial connecting portion formed integrally with the third coupling portion and disposed on an inner side of the coil assembly in the radial direction, wherein the first coupling portion and the second coupling portion extend toward the motor stator from the end of the winding so as to be substantially parallel to a rotation axis of the motor stator, the first busbar and the second busbar are arranged to be spaced apart from each other by a predetermined distance in the radial direction of the motor stator, and the first coupling portion is positioned on an inner side relative to the first busbar in the radial direction, and the second coupling portion is positioned on an inner side relative to the second busbar in the radial direction.

2. The terminal assembly of claim 1, wherein the first busbar and the second busbar extend in an arc shape in a circumferential direction of the motor stator, and one surface of each of the first busbar and the second busbar is substantially parallel to an extension direction of the first coupling portion and the second coupling portion.

3. The terminal assembly of claim 2, wherein the first connecting member includes a first bent portion having respective ends connected to and integrally formed with the first coupling portion and the first busbar and extending outwardly in the radial direction of the motor stator, the second connecting member includes a second bent portion having respective ends connected to and integrally formed with the second coupling portion and the second busbar and extending outwardly in the radial direction of the motor stator, and the second bent portion extends to be longer than the first bent portion in the radial direction of the motor stator.

4. The terminal assembly of claim 3, wherein one surface of the second busbar is disposed in a position overlapping one surface of the first busbar by a predetermined area.

5. The terminal assembly of claim 4, wherein the second connecting member is provided in two or more connecting members, at least one of the second busbars is disposed to cover an upper end portion of the first busbar, and at least another one of the second busbars is disposed to cover a lower end portion of the first busbar.

6. The terminal assembly of claim 1, wherein the first busbar and the second busbar extend in an arc shape in a circumferential direction of the motor stator, and one surface of each of the first busbar and the second busbar is substantially perpendicular to an extension direction of the first coupling portion and the second coupling portion.

7. The terminal assembly of claim 6, wherein the first busbar and the second busbar include a protrusion disposed at an outermost portion and protruding toward the opposite side of the motor stator with respect to the radial direction of the motor stator.

8. The terminal assembly of claim 1, wherein the serial connecting portion is bent stepwise in the radial direction of the motor stator.

9. The terminal assembly of claim 8, wherein the jump wires are arranged to be spaced apart from each other by a predetermined distance in the radial direction of the motor stator, the serial connecting portions of all of the jump wires are located at the same height based on an axial direction of the motor stator, and a predetermined area of one surface of each of the serial connecting portions is in contact with an adjacent one of the serial connecting portions.

10. The terminal assembly of claim 1, further comprising:

a coating portion covering and coating the ends of the first connecting member, the at least one second connecting member, the jump wires, and the coil assembly.

11. A terminal assembly applied to a motor stator including a coil assembly having a plurality of windings therein, the terminal assembly comprising:

a first connecting member including a first coupling portion having one end electrically coupled to an end of a winding and a first busbar formed integrally with the first coupling portion and disposed on a radial outer side of the coil assembly;

at least one second connecting member including a second coupling portion having one end electrically coupled to at least one winding adjacent to the winding coupled to the first busbar and a second busbar integrally formed with the second coupling portion and disposed on an outer side of the coil assembly in a radial direction; and two or more jump wires each including a third coupling portion having one end electrically coupled to the end of the winding and a serial connecting portion formed integrally with the third coupling portion and disposed on an inner side of the coil assembly in a radial direction, wherein the first coupling portion and the second coupling portion extend toward the motor stator from the end of the winding so as to be substantially parallel to a rotation axis of the motor stator, the first busbar and the second busbar are arranged to be spaced apart from each other by a predetermined distance in a radial direction of the motor stator, and the third coupling portion is positioned to overlap the first coupling portion or the second coupling portion in the radial direction.

12. A terminal assembly applied to a motor stator including a coil assembly having a plurality of windings therein, the terminal assembly comprising:

a first connecting member including a first coupling portion having one end electrically coupled to an end of a winding and a first busbar formed integrally with the first coupling portion and disposed on a radial outer side of the coil assembly;

at least one second connecting member including a second coupling portion having one end electrically coupled to at least one winding adjacent to the winding coupled to the first busbar and a second busbar integrally formed with the second coupling portion and disposed on an outer side of the coil assembly in a radial direction; and two or more jump wires each including a third coupling portion having one end electrically coupled to the end of the winding and a serial connecting portion formed integrally with the third coupling portion and disposed on an inner side of the coil assembly in a radial direction, wherein the first coupling portion and the second coupling portion extend toward the motor stator from the end of the winding so as to be substantially parallel to a rotation axis of the motor stator, the first busbar and the second busbar are arranged to be spaced apart from each other by a predetermined distance in a radial direction of the motor stator, and the serial connecting portion is bent stepwise in the radial direction of the motor stator.

* * * * *